US010849135B2

(12) United States Patent
Ni et al.

(10) Patent No.: US 10,849,135 B2
(45) Date of Patent: Nov. 24, 2020

(54) NETWORK CONNECTION CONFIGURATION METHOD AND APPARATUS

(71) Applicant: HUAWEI TECHNOLOGIES CO., LTD., Shenzhen (CN)

(72) Inventors: Hui Ni, Beijing (CN); Yan Li, Beijing (CN); Yongcui Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/239,548

(22) Filed: Jan. 4, 2019

(65) Prior Publication Data
US 2019/0141720 A1 May 9, 2019

Related U.S. Application Data

(63) Continuation of application No. PCT/CN2016/088943, filed on Jul. 6, 2016.

(51) Int. Cl.
*H04W 72/08* (2009.01)
*H04W 8/22* (2009.01)
(Continued)

(52) U.S. Cl.
CPC .......... *H04W 72/087* (2013.01); *H04W 8/22* (2013.01); *H04W 48/16* (2013.01); *H04W 48/18* (2013.01);
(Continued)

(58) Field of Classification Search
CPC ... H04W 72/087; H04W 48/16; H04W 48/18; H04W 76/10; H04W 80/10; H04W 4/50;
(Continued)

(56) References Cited

U.S. PATENT DOCUMENTS 5,729,682 A * 3/1998 Marquis ................ H04L 29/06
709/227
2004/0082315 A1* 4/2004 Aoki .................... G06Q 10/109
455/412.1
(Continued)

FOREIGN PATENT DOCUMENTS

| CN | 101291493 A | 10/2008 |
| CN | 101932034 A | 12/2010 |

(Continued)

OTHER PUBLICATIONS

Motorola Mobility et al:"Solution: PDU Sessions served by different Network slices", 3GPP Draft; S2-161574, WG2, No. Sophia Antipolis, France; Apr. 5, 2016, XP051086558, 4 pages.
(Continued)

*Primary Examiner* — Warner Wong
(74) *Attorney, Agent, or Firm* — Kilpatrick Townsend & Stockton LLP

(57) ABSTRACT

This application provides a network connection configuration method and an apparatus. The method is as follows: After a terminal device obtains network configuration information of an application in the terminal device, the terminal device sends the network configuration information to a core network control plane network element, so that the core network control plane network element may determine a network connection that is of the application and is between the terminal device and the data network and that meets the network configuration information.

16 Claims, 7 Drawing Sheets

(51) Int. Cl.
*H04W 76/10* (2018.01)
*H04W 48/16* (2009.01)
*H04W 48/18* (2009.01)
H04L 12/24 (2006.01)
H04L 29/08 (2006.01)

(52) U.S. Cl.
CPC ....... *H04W 76/10* (2018.02); *H04L 29/08585* (2013.01); *H04L 41/0806* (2013.01); *H04L 41/0853* (2013.01); *H04L 67/322* (2013.01)

(58) Field of Classification Search
CPC ............. H04L 41/0806; H04L 41/0853; H04L 29/06326; H04L 29/08576; H04L 29/08585; H04L 29/06537; H04L 67/14; H04L 67/141; H04L 67/322; H04L 65/1069
See application file for complete search history.

(56) References Cited

U.S. PATENT DOCUMENTS

| | | | |
|---|---|---|---|
| 2004/0142697 | A1 | 7/2004 | Knaebchen et al. |
| 2007/0002821 | A1* | 1/2007 | Carlson .................. H04L 29/06 370/349 |
| 2008/0225798 | A1* | 9/2008 | Trossen ............ H04W 36/0016 370/331 |
| 2009/0201847 | A1* | 8/2009 | Yabo ................... H04W 72/087 370/317 |
| 2011/0206013 | A1 | 8/2011 | Aramoto et al. |
| 2012/0087330 | A1 | 4/2012 | Zhu et al. |
| 2012/0282941 | A1 | 11/2012 | Lu et al. |
| 2014/0078898 | A1* | 3/2014 | Anchan ............ H04W 36/0044 370/230 |
| 2014/0098740 | A1* | 4/2014 | Xing ....................... H04W 4/50 370/328 |
| 2017/0048755 | A1* | 2/2017 | Lu .......................... H04W 76/18 |
| 2017/0359829 | A1* | 12/2017 | Tabet ................... H04W 72/048 |

FOREIGN PATENT DOCUMENTS

| | | |
|---|---|---|
| CN | 102273267 A | 12/2011 |
| CN | 103024824 A | 4/2013 |
| CN | 103037449 A | 4/2013 |
| EP | 2352339 A1 | 8/2011 |
| WO | 2015191487 A1 | 12/2015 |

OTHER PUBLICATIONS

Nokia et al: "Slice Selection solution update", 3GPP Draft; S2-162982, vol. SA WG2, No. Nanjing, May 27, 2016, XP051116482, 12 pages.
A. Yegin et al. On Demand Mobility Management, draft-ietf-dmm-ondemand-mobility-02, DMM Working Group. Feb. 18, 2016. 11 pages.

* cited by examiner

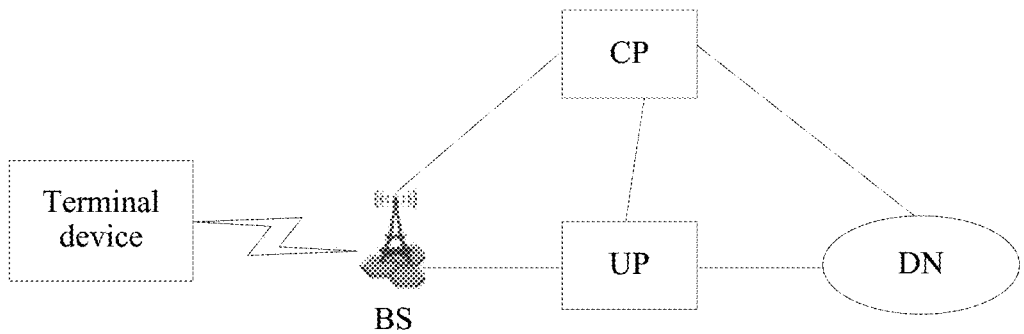

A terminal device obtains network configuration information of an application in the terminal device, where the network configuration information is used to indicate a configuration that a network connection that is of the application and that is between the terminal device and a data network needs to meet

302

The terminal device sends the network configuration information to a core network control plane network element

FIG. 3

NETWORK CONNECTION CONFIGURATION METHOD AND APPARATUS

CROSS-REFERENCE TO RELATED APPLICATIONS

This application is a continuation of International Application No. PCT/CN2016/088943, filed on Jul. 6, 2016, the disclosure of which is hereby incorporated by reference in its entirety.

TECHNICAL FIELD

This application relates to the field of communications technologies, and in particular, to a network connection configuration method and an apparatus.

BACKGROUND

A mobile communications network includes two parts: an access network and a core network. The access network is an edge part of the mobile communications network, and is responsible for connecting a terminal device to the core network, to implement a connection between the terminal device and the network. For example, the access network is an evolved universal terrestrial radio access network (E-UTRAN). The core network is responsible for connecting the terminal device to different networks based on a call request or a data request sent by the terminal device by using the access network, and is responsible for charging, mobility management, and the like. For example, the core network is an evolved packet core (EPC).

The core network mainly includes the following key logical network elements: a mobility management entity (MME), a serving gateway (S-GW), a packet data network gateway (P-GW), a home subscriber server (HSS), and a policy and charging rules function (PCRF).

In the core network, core network devices may be classified into a control plane (CP) network element and a user plane (UP) network element based on logical functions of the core network devices. The control plane network element is a network element responsible for mobility management or forwarding path management in a mobile network, and may be an MME, an S-GW, or a P-GW, may be an S-GW control plane or a P-GW control plane, or may be a control plane network element formed by integrating any network elements in an MME, an S-GW, and a P-GW, or a control plane network element formed by integrating an S-GW control plane and a P-GW control plane. The user plane network element is mainly responsible for forwarding a service packet of a terminal device, and may be a physical forwarding plane device such as an S-GW, a P-GW, a router, a switch, or a software-defined networking (SDN) virtual machine (switch), or may be a virtual forwarding plane network element such as an S-GW forwarding plane or a P-GW forwarding plane.

With development of wireless communications technologies and constantly changing user requirements, a terminal device type constantly changes, and more applications that meet various user requirements are born. However, services requested by different types of terminal devices or requested by different applications in a same terminal device have different requirements for a network. For example, a service requested by an application that provides a real-time video service has a relatively high requirement for service continuity of a network, while a service requested by an application that provides a common data service such as web browsing almost has no requirement for service continuity of a network. An existing mobile communications network provides networks with a same configuration for services requested by all types of terminal devices and all applications, and consequently, different services cannot be processed as required, resulting in relatively poor flexibility of service processing in the mobile communications network.

SUMMARY

Embodiments of the present disclosure provide a network connection configuration method and an apparatus, to resolve a prior-art problem that different services cannot be processed as required because a mobile communications network provides networks with a same configuration for services requested by all types of terminal devices and all applications.

Specific technical solutions provided in the present disclosure are as follows:

According to a first aspect, an embodiment of the present disclosure provides a network connection configuration method, the method is applied to a mobile communications network, and the method includes:

after a terminal device obtains network configuration information of an application in the terminal device, the terminal device sends the network configuration information to a core network control plane network element, so that the core network control plane network element determines a network connection that is of the application and is between the terminal device and a data network and that meets the network configuration information, where the network configuration information is used to indicate a configuration for the network connection, used by the application, between the terminal device and the data network.

According to the foregoing method, in this embodiment of the present disclosure, because the network configuration information can indicate the configuration that the network connection that is of the application and that is between the terminal device and the data network needs to meet, the mobile communications network can provide networks with different configurations based on requirements of services requested by applications in different types of terminal devices or requirements of services requested by different applications in a same terminal device, so that different services can be processed as required, thereby improving flexibility of service processing in the mobile communications network.

In a possible design, the network configuration information may include but is not limited to at least one of or a combination of the following items: mobility management requirement information, packet transfer mode information, quality of service QoS requirement information, network slice information, and a service type.

According to the foregoing method, the terminal device may obtain network configuration information that includes a plurality of service requirements, so that a service can be processed as required, thereby improving flexibility of service processing in the mobile communications network.

In a possible design, the network connection may be a protocol data unit PDU connection, a bearer, or a service flow, where one PDU connection may include a plurality of bearers or a plurality of service flows, and one bearer may correspond to a plurality of service flows.

Because different network connections implement different services, according to the foregoing method, after the terminal device sends the network configuration information to the core network control plane network element, the core network control plane network element may determine the network connection that is of the application and that is between the terminal device and the data network, to implement different services.

In a possible design, when the terminal device obtains the network configuration information, the terminal device may obtain the network configuration information based on an application identifier of the application, or may obtain the network configuration information based on an application identifier of the application and a type of the terminal device.

According to the foregoing method, the terminal device may accurately obtain the network configuration information of the application.

In a possible design, the terminal device may obtain the network configuration information in the following three manners.

In a first manner, the terminal device obtains the network configuration information that is locally configured.

In a second manner, the terminal device obtains the network configuration information by using network information configuration software, and the network information configuration software is software that provides the corresponding network configuration information for the application in the terminal device, for example, a phone manager or an application market.

In a third manner, the terminal device sends a configuration information request to an application server, and receives the network configuration information returned by the application server, where the application server is configured to expose business logic to the terminal device by using various types of protocols.

According to the foregoing method, the terminal device may accurately obtain the network configuration information of the application.

In a possible design, after the terminal device obtains the network configuration information, and before the terminal device sends the network configuration information to the core network control plane network element, the terminal device verifies (for example, correctness verification, executability verification, or reasonableness verification) the network configuration information, and the verification succeeds.

According to the foregoing method, the terminal device can improve accuracy and executability of the network configuration information for a service requested by the terminal device, thereby ensuring reliability of service processing of the terminal device.

In a possible design, when the terminal device sends the network configuration information to the core network control plane network element, the terminal device sends, to the core network control plane network element, a message carrying the network configuration information, where the message includes a service request message, an access request message, or a resource modification request message.

According to the foregoing method, the terminal device successfully sends the network configuration information to the core network control plane network element.

According to a second aspect, an embodiment of the present disclosure further provides a network connection configuration method, the method is applied to a mobile communications network, and the method includes:

after receiving network configuration information that is of an application and that is sent by a terminal device, a core network control plane network element determines a network connection that is of the application and is between the terminal device and the data network and that meets the network configuration information, where the network configuration information is used to indicate a configuration for the network connection, used by the application, between the terminal device and the data network.

In this embodiment of the present disclosure, because the network configuration information can indicate the configuration that the network connection that is of the application and that is between the terminal device and the data network needs to meet, the mobile communications network can provide networks with different configurations based on requirements of services requested by applications in different types of terminal devices or requirements of services requested by different applications in a same terminal device, so that different services can be processed as required, thereby improving flexibility of service processing in the mobile communications network.

In a possible design, that the core network control plane network element determines a network connection that is of the application and is between the terminal device and the data network and that meets the network configuration information includes the following steps:

determining, by the core network control plane network element in an established network connection between the terminal device and the data network, whether there is at least one to-be-selected network connection that meets the network configuration information; and when there is the at least one to-be-selected network connection, using, by the core network control plane network element, one of the at least one to-be-selected network connection as the network connection; or when there is no at least one to-be-selected network connection, initiating, by the core network control plane network element, a procedure of establishing the network connection that meets the network configuration information.

According to the foregoing method, the core network control plane network element may determine the network connection that is of the application and is between the terminal device and the data network and that meets the network configuration information.

In a possible design, the network connection may be a protocol data unit PDU connection, a bearer, or a service flow, where one PDU connection may include a plurality of bearers or a plurality of service flows, and one bearer may correspond to a plurality of service flows.

Because different network connections implement different services, according to the foregoing method, after the terminal device sends the network configuration information to the core network control plane network element, the core network control plane network element may determine the network connection that is of the application and that is between the terminal device and the data network, to implement different services.

In a possible design, when the core network control plane network element receives the network configuration information sent by the terminal device, the core network control plane network element receives a message that is sent by the terminal device and that carries the network configuration information, where the message includes a service request message, an access request message, or a resource modification request message.

According to the foregoing method, the core network control plane network element receives the network configuration information sent by the terminal device.

In a possible design, after the core network control plane network element receives the network configuration information, and before the core network control plane network element determines the network connection, the core network control plane network element may verify (for example, correctness verification, executability verification, or reasonableness verification) the network configuration information, and the verification succeeds.

According to the foregoing method, the core network control plane network element can improve accuracy and executability of the network configuration information for a service requested by the terminal device, thereby ensuring reliability of service processing of the terminal device.

In a possible design, the network configuration information may include at least one of or a combination of the following items: mobility management requirement information, packet transfer mode information, quality of service QoS requirement information, network slice information, and a service type.

According to the foregoing method, the core network control plane network element may receive network configuration information that includes a plurality of service requirements, to determine the network connection that is of the application and is between the terminal device and the data network and that meets the network configuration information, so that a service can be processed as required, thereby improving flexibility of service processing in the mobile communications network.

According to a third aspect, an embodiment of the present disclosure further provides a terminal device. The terminal device has a function of implementing behavior of the terminal device in the foregoing method examples. The function may be implemented by hardware, or may be implemented by hardware by executing corresponding software. The hardware or software includes one or more modules corresponding to the foregoing function.

In a possible design, a structure of the terminal device includes an obtaining unit and a sending unit, and the units may perform corresponding functions in the foregoing method examples. For details, refer to detailed descriptions in the method examples. Details are not described herein again.

In a possible design, a structure of the terminal device includes a transceiver, a processor, a bus, and a memory, the transceiver is configured to perform communication interaction with another device in a mobile communications network, and the processor is configured to support the terminal device in performing a corresponding function in the foregoing method. The memory is coupled to the processor, and the memory stores a program instruction and data that are necessary for the terminal device.

According to a fourth aspect, an embodiment of the present disclosure further provides a core network control plane network element. The core network control plane network element has a function of implementing behavior of the core network control plane network element in the foregoing method examples. The function may be implemented by hardware, or may be implemented by hardware by executing corresponding software. The hardware or software includes one or more modules corresponding to the foregoing function.

In a possible design, a structure of the core network control plane network element includes an obtaining unit and a processing unit, and the units may perform corresponding functions in the foregoing method examples. For details, refer to detailed descriptions in the method examples. Details are not described herein again.

In a possible design, a structure of the core network control plane network element includes a transceiver, a processor, a bus, and a memory, the transceiver is configured to perform communication interaction with another device in a mobile communications network, and the processor is configured to support the core network control plane network element in performing a corresponding function in the foregoing method. The memory is coupled to the processor, and the memory stores a program instruction and data that are necessary for the core network control plane network element.

According to a fifth aspect, an embodiment of the present disclosure further provides a mobile communications network system, and the mobile communications network system includes a terminal device and a core network control plane network element.

According to the network connection configuration method provided in the embodiments of the present disclosure, after the terminal device obtains the network configuration information of the application in the terminal device, the terminal device sends the network configuration information to the core network control plane network element, so that the core network control plane network element may determine the network connection that is of the application and is between the terminal device and the data network and that meets the network configuration information. The network configuration information is used to indicate the configuration that the network connection that is of the application and that is between the terminal device and the data network needs to meet. In the embodiments of the present disclosure, because the network configuration information can indicate the configuration that the network connection that is of the application and that is between the terminal device and the data network needs to meet, the mobile communications network can provide networks with different configurations based on requirements of services requested by applications in different types of terminal devices or requirements of services requested by different applications in a same terminal device, so that different services can be processed as required. Therefore, services of different applications in the terminal device are processed as required, thereby improving flexibility of service processing in the mobile communications network.

BRIEF DESCRIPTION OF DRAWINGS

FIG. 2 is a schematic diagram of another mobile communications network architecture according to an embodiment of the present disclosure;

FIG. 3 is a flowchart of a network connection configuration method according to an embodiment of the present disclosure;

DESCRIPTION OF EMBODIMENTS

Figure 1:
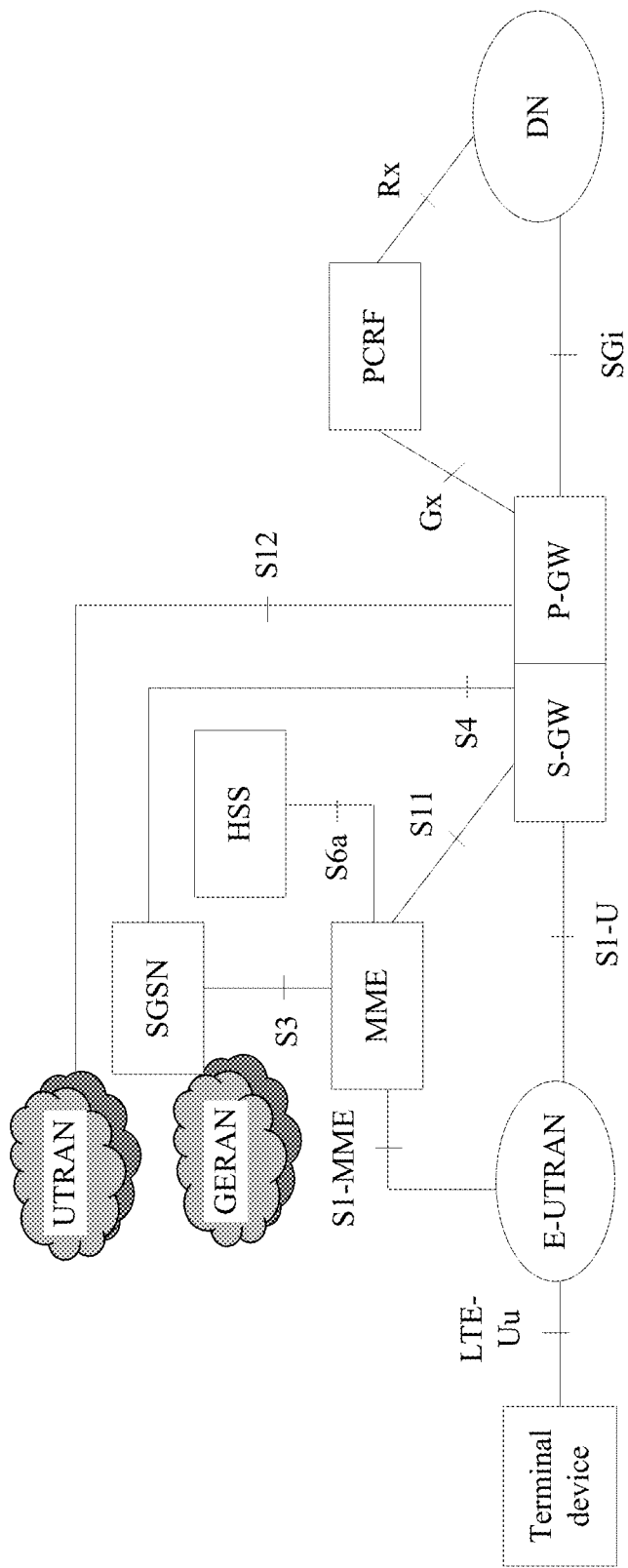
FIG. 1 is a schematic diagram of a mobile communications network architecture according to an embodiment of the present disclosure.

To make the objectives, technical solutions, and advantages of the present disclosure clearer, the following further describes the present disclosure in detail with reference to the accompanying drawings. Apparently, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

The embodiments of the present disclosure provide a network connection configuration method and an apparatus, to resolve a prior-art problem that a mobile communications network provides networks with a same configuration for services requested by all types of terminal devices and all applications, and consequently, different services cannot be processed as required, resulting in relatively poor flexibility of service processing in the mobile communications network. The method and the apparatus are based on a same inventive concept. Because a problem-resolving principle of the method is similar to that of the apparatus, mutual reference may be made between apparatus implementation and method implementation. Repeated parts are not described.

In the technical solutions of the embodiments of the present disclosure, after a terminal device obtains network configuration information of an application in the terminal device, the terminal device sends the network configuration information to a core network control plane network element, so that the core network control plane network element may determine a network connection, for use by the application, between the terminal device and a data network such that the network connection satisfies the network configuration information. The network configuration information is used to indicate a configuration for the network connection, used by the application, between the terminal device and the data network. In the embodiments of the present disclosure, because the network configuration information can indicate the configuration that the network connection, used by the application, between the terminal device and the data network, a mobile communications network can provide networks with different configurations based on requirements of services requested by applications in different types of terminal devices or requirements of services requested by different applications in a same terminal device, so that different services can be processed as required, thereby improving flexibility of service processing in the mobile communications network.

Some terms in this application are explained below, to help persons skilled in the art have a better understanding.

(1). A core network control plane network element related to the embodiments of the present disclosure is a network element responsible for mobility management and/or forwarding path management in a mobile network, and may be but is not limited to an MME, an S-GW, or a P-GW in a core network, may be an S-GW control plane or a P-GW control plane, or may be a control plane network element formed by integrating any network elements in an MME, an S-GW, and a P-GW, or a control plane network element formed by integrating an S-GW control plane and a P-GW control plane.

(2). A core network user plane network element, also referred to as a core network forwarding plane network element, related to the embodiments of the present disclosure is a network element responsible for providing service packet forwarding for a terminal device, and may be but is not limited to a physical forwarding plane device such as an S-GW, a P-GW, a router, a switch, or an SDN switch, or may be a virtual forwarding plane network element such as an S-GW forwarding plane or a P-GW forwarding plane.

(3). A data network (DN) related to the embodiments of the present disclosure is a network that a terminal device finally needs to establish a connection to and access, and may be but is not limited to a packet data network (PDN) such as the Internet, a virtual private network (VPN), or an IP multimedia service (IMS) network, or a Wireless Application Protocol (WAP) network provided by an operator.

(4). A base station (BS) related to the embodiments of the present disclosure is a device that provides a wireless access service for a terminal device, and includes but is not limited to an evolved NodeB (eNB), a radio network controller (RNC), a NodeB (NB), a base station controller (BSC), a base transceiver station (BTS), a home base station (for example, Home evolved NodeB or Home NodeB, HNB), a baseband unit (BBU), an access point (AP), a Wireless Fidelity access point (Wi-Fi AP), a Worldwide Interoperability for Microwave Access (WiMAX) BS, and the like.

(5). A terminal device, also referred to as user equipment (UE), related to the present disclosure is a device that provides data connectivity for a user, for example, a handheld device, an in-vehicle device, a wearable device, a computing device, or a mobile station (MS) that has a wireless connection function, another processing device connected to a wireless modem, or a mobile terminal that communicates with one or more core networks by using an access network.

(6). An application is a software set for implementing a specific service, for example, WeChat, Youku, a video website (YouTube), or a photo sharing application (Snapchat). When enabling an application, a terminal device is connected to a data network by using an access network and a core network, and finally implements a service corresponding to the application.

(7). The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

(8). In the descriptions of this application, words such as "first" and "second" are merely used for distinction and description, and shall not be understood as an indication or implication of relative importance or an indication or implication of an order.

FIG. 1 shows a possible mobile communications network architecture, namely, an evolved packet system (EPS) architecture, to which a network connection configuration method is applicable according to an embodiment of the present disclosure. The EPS architecture is divided into two parts: an access network and a core network. The core network is an EPC.

The access network may be an evolved E-UTRAN, and implements a wireless access-related function for a terminal device. The terminal device includes but is not limited to a device such as an eNodeB, a Wi-Fi AP, or a WiMAX BS.

The EPC mainly includes the following key logical network elements: an MME, an S-GW, a P-GW, an HSS, and a PCRF. The network elements are described in detail below.

The MME mainly completes signaling plane function processing, such as user authentication, handover, mobility management on a terminal in an idle mode, or user context and bearer management.

The HSS is configured to store subscription information of a user.

The S-GW is used for routing and forwarding of a data network, and provides a lawful interception-related function.

The P-GW is a gateway connected to an external data network, is a user plane anchor between a 3rd Generation Partnership Project (3GPP) access network and a non-3GPP access network, and is responsible for functions such as user address allocation, policy control and charging rules execution, and lawful interception. The S-GW and the P-GW may be deployed on a same entity device, or may be separately deployed on different entity devices. This is not limited in this embodiment of the present disclosure.

The PCRF provides a policy and charging rule.

When enabling an application, the terminal device may be connected to the P-GW by using the access network, and create a protocol data unit (PDU) connection by using the P-GW, to access the external data network.

In the mobile communications network architecture shown in FIG. 1, the terminal device, the access network, the network elements in the EPC, and the DN perform communication interaction with each other by using corresponding interfaces.

Based on the EPS architecture shown in FIG. 1, to reduce hardware platform design costs and accelerate mobile packet network deployment, an SDN idea is introduced in a mobile communications network, so that control and forwarding of a gateway device can be separated. FIG. 2 shows another possible mobile communications network architecture. As shown in the figure, the network architecture includes a core network control plane network element and a core network user plane network element.

The core network control plane network element is a network element responsible for mobility management and/or forwarding path management in a mobile communications network, and the core network user plane network element is a network element responsible for providing service packet forwarding for a user. Specific functions are not described herein.

A network connection configuration method provided in an embodiment of the present disclosure is applicable to the terminal device in the mobile communications network shown in FIG. 1 or FIG. 2. Referring to FIG. 3, a specific procedure of the method includes the following steps.

Step 301: The terminal device obtains network configuration information of an application in the terminal device, where the network configuration information is used to indicate a configuration for a network connection of the application between the terminal device and a data network.

Optionally, the network configuration information may include but is not limited to at least one of or a combination of the following items: mobility management requirement information, packet transfer mode information, quality of service (QoS) requirement information, network slice information, and a service type.

The mobility management requirement information is used to indicate whether the network connection needs to provide mobility management support for the application. For example, the mobility management requirement information includes: mobility management support is required, mobility management support is not required, or whether mobility management support is required is not limited.

The packet transfer mode information is used to indicate a packet transfer mode that the network connection can provide for the application. For example, the packet transfer mode information includes a non-IP packet transfer mode (such as a MAC packet transfer mode) or an IP packet transfer mode. Optionally, when the packet transfer mode information includes the IP packet transfer mode, the network configuration information may further include a packet type in the IP packet transfer mode, for example, Internet Protocol version 4 (IPv4), Internet Protocol version 6 (IPv6), or IPv4/v6.

The QoS requirement information is used to indicate a QoS requirement that the network connection needs to provide for the application. The QoS requirement information may include a delay requirement, a bandwidth requirement, a reliability requirement, and the like.

The network slice information is used to indicate whether the network connection needs to provide a network slice service for the application. Optionally, when the network slice information indicates that the network connection needs to provide a network slice for the application, the network configuration information may further include an identifier of a network slice required by the application. The network slice may be a mobile broadband (MBB) network slice, a vehicle to vehicle (V2V) network slice, or a machine type communication (MTC) network slice.

The service type is used to indicate a service type that the network connection needs to implement for the application. For example, the service type includes: The application requires the network connection to provide enhanced mobile broadband (eMBB), critical communication (CriC), massive Internet of Things (mIoT), or the like.

In some embodiments, the network connection may be a PDU connection, a bearer, or a service flow. A granularity relationship among the PDU connection, the bearer, and the service flow is: PDU connection>bearer>service flow. To be specific, one PDU connection may include a plurality of bearers or a plurality of service flows, and one bearer may correspond to a plurality of service flows.

Optionally, the terminal device may obtain the network configuration information based on an application identifier of the application, or may obtain the network configuration information based on an application identifier of the application and a type of the terminal device.

In some embodiments, the terminal device obtains the network configuration information in the following three manners.

In a first manner, the terminal device obtains the network configuration information that is locally configured on the terminal device.

For example, the terminal device obtains the application identifier of the application, and determines, in a locally stored correspondence between a plurality of application identifiers and network configuration information, the network configuration information corresponding to the application identifier of the application.

For another example, the terminal device obtains the application identifier of the application and the type of the terminal device, and determines, in a locally stored correspondence between network configuration information and a plurality of application identifiers and terminal device types, the network configuration information corresponding to the application identifier of the application and the type of the terminal device.

In a second manner, the terminal device obtains the network configuration information by using network information configuration software.

The network information configuration software is software that provides the corresponding network configuration information for the application of the terminal device, and may be specifically a phone manager or an application market.

For example, the terminal device obtains the application identifier of the application, and feeds back the application identifier of the application to the network information configuration software. The network information configuration software configures and generates the corresponding network configuration information for the application of the terminal device, and feeds back the generated network configuration information to the terminal device. The network information configuration software may configure and generate the corresponding network configuration information for the application according to an operator policy.

For another example, the terminal device obtains the application identifier of the application and the type of the terminal device, and feeds back the application identifier of the application and the type of the terminal device to the network information configuration software. The network information configuration software configures and generates the corresponding network configuration information for the application of the terminal device, and feeds back the generated network configuration information to the terminal device. The network information configuration software may configure and generate the corresponding network configuration information for the application according to an operator policy.

For still another example, the terminal device downloads the application from the network information configuration software (application market), and obtains the network configuration information of the application. The network configuration information may be stored by an application developer of the application by using a manifest file when the application developer of the application releases the application to the application market.

In some embodiments, the network information configuration software verifies the generated network configuration information, and feeds back the network configuration information to the terminal device after the verification succeeds. That the network information configuration software verifies the network configuration information includes: The network information configuration software performs correctness verification, executability verification, or reasonableness verification on the network configuration information according to a verification policy of an operator of the application.

In a third manner, the terminal device sends a configuration information request to an application server, and receives the network configuration information returned by the application server.

The application server is configured to expose business logic to the terminal device by using various types of protocols.

In some embodiments, that the terminal device receives the network configuration information returned by the application server includes: The terminal device receives a configuration information response that is returned by the application server and that carries the network configuration information.

For example, the terminal device obtains the application identifier of the application, and sends the obtained application identifier of the application to the application server. The application server determines, based on the application identifier of the application and in a stored correspondence between a plurality of application identifiers and network configuration information, the network configuration information corresponding to the application identifier of the application, or configures and generates the corresponding network configuration information for the application based on the application identifier of the application, and sends the determined or generated network configuration information to the terminal device. Optionally, the configuration information request sent by the terminal device to the application server may carry the application identifier of the application, and the configuration information response sent by the application server to the terminal device may carry the network configuration information.

For another example, the terminal device obtains the application identifier of the application and the type of the terminal device, and sends the obtained application identifier of the application and the obtained type of the terminal device to the application server. The application server determines, based on the application identifier of the application and the type of the terminal device and in a stored correspondence between network configuration information and a plurality of application identifiers and terminal device types, the network configuration information corresponding to the application identifier of the application and the type of the terminal device, or configures and generates the corresponding network configuration information for the application based on the application identifier of the application and the type of the terminal device, and sends the determined or generated network configuration information to the terminal device. Optionally, the configuration information request sent by the terminal device to the application server may carry the application identifier of the application and the type of the terminal device, and the configuration information response sent by the application server to the terminal device may carry the network configuration information.

In some embodiments, the application server verifies the determined network configuration information before sending the network configuration information to the terminal device, and sends the network configuration information to the terminal device after the verification succeeds. That the application server verifies the network configuration information includes: The application server performs correctness verification, executability verification, or reasonableness verification on the network configuration information according to a verification policy of an operator of the application.

In the second and the third manners, the network information configuration software or the application server verifies the determined network configuration information before sending the network configuration information to the terminal device, and sends the network configuration information to the terminal device after determining that the verification succeeds. Therefore, accuracy and executability of the network configuration information for a service requested by the terminal device can be improved, thereby ensuring reliability of service processing of the terminal device.

In the foregoing three manners, the terminal device can accurately obtain the network configuration information corresponding to the application, so that the mobile communications network can provide a network with a corresponding configuration based on a requirement of a service requested by the application of the terminal device type.

Step 302: The terminal device sends the network configuration information to a core network control plane network element.

After the terminal device obtains the network configuration information, and before step 302 is performed, the method further includes: The terminal device verifies the network configuration information, and the verification succeeds.

The verification performed by the terminal device on the network configuration information includes correctness verification, executability verification, or reasonableness verification performed on specific information included in the network configuration information. According to the foregoing method, accuracy and executability of the network configuration information for a service requested by the terminal device can be improved, and reliability of service processing of the terminal device can be ensured.

In some embodiments, when the terminal device performs step 302, the terminal device may send, to the core network control plane network element, a message carrying the network configuration information. The message includes a service request message, an access request message, or a resource modification request message.

The access request message is sent by the terminal device to the core network control plane network element in a network registration process. For example, the access request message may be sent by the terminal device when the terminal device is powered on. The service request message is a request for establishing a signaling connection for each interface of a radio access network, and is used to enable the terminal device to be switched from an idle mode to a connected mode. The resource modification request message is a request actively initiated by the terminal device when the terminal device has a special service requirement.

According to the network connection configuration method in this embodiment of the present disclosure, after the terminal device obtains the network configuration information of the application in the terminal device, the terminal device sends the network configuration information to the core network control plane network element, so that the core network control plane network element may determine the network connection, to be used by the application, between the terminal device and the data network such that the network connection satisfies the network configuration information. The network configuration information is used to indicate the configuration for the network connection of the application between the terminal device and the data network. In this embodiment of the present disclosure, because the network configuration information can indicate a desired configuration for the network connection of the application between the terminal device and the data network, the mobile communications network can provide networks with different configurations based on requirements of services requested by applications in different types of terminal devices or requirements of services requested by different applications in a same terminal device, so that different services can be processed as required, thereby improving flexibility of service processing in the mobile communications network.

Figure 4:
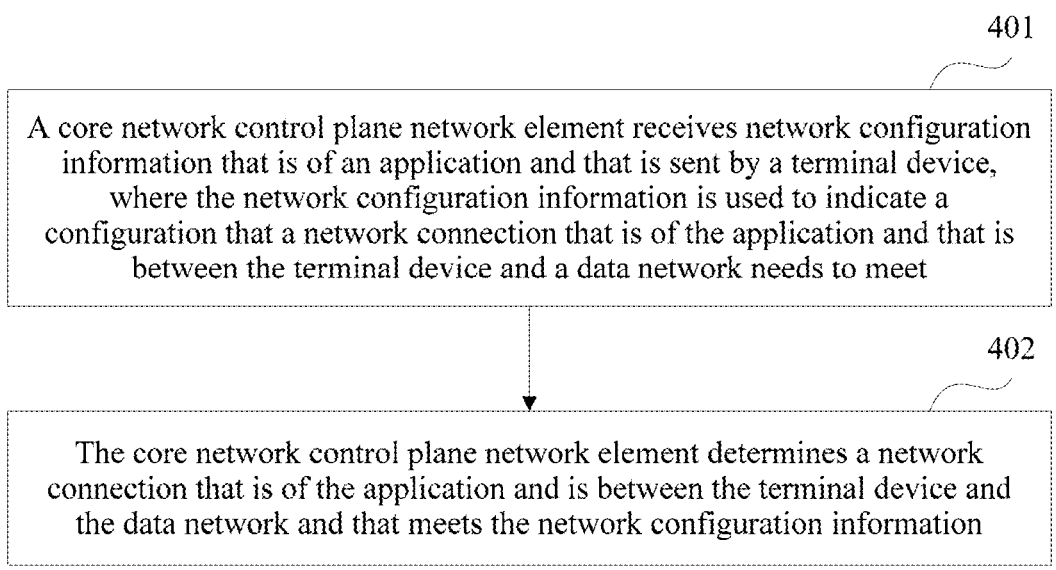
FIG. 4 is a flowchart of another network connection configuration method according to an embodiment of the present disclosure.

An embodiment of the present disclosure further provides another network connection configuration method. The method is applicable to the core network control plane network element in the mobile communications network shown in FIG. 1 or FIG. 2. Referring to FIG. 4, a specific procedure of the method includes the following steps.

Step 401: The core network control plane network element receives network configuration information of an application, which is sent by a terminal device. The network configuration information is used to indicate a desired configuration for a network connection of the application between the terminal device and a data network.

In some embodiments, the network connection may be a protocol data unit PDU connection, a bearer, or a service flow. A granularity relationship among the PDU connection, the bearer, and the service flow is: PDU connection>bearer>service flow. To be specific, one PDU connection may include a plurality of bearers or a plurality of service flows, and one bearer may correspond to a plurality of service flows.

In some embodiments, the network configuration information may include but is not limited to at least one of or a combination of the following items: mobility management requirement information, packet transfer mode information, quality of service QoS requirement information, network slice information, and a service type. Specific examples of the mobility management requirement information, the packet transfer mode information, the quality of service QoS requirement information, the network slice information, and the service type are the same as those described in step 301 in FIG. 3. Details are not described herein again.

Step 402: The core network control plane network element determines a network connection, for the application to use, between the terminal device and the data network such that the network connection satisfies the network configuration information.

In some embodiments, that the core network control plane network element determines a network connection of the application between the terminal device and the data network such that the network connection meets the network configuration information includes the following steps.

The core network control plane network element determines, in an established network connection between the terminal device and the data network, whether there is at least one to-be-selected network connection that meets the network configuration information.

When there is the at least one to-be-selected network connection, the core network control plane network element uses one of the at least one to-be-selected network connection as the network connection. For example, it is assumed that a delay requirement included in network configuration information of a specific application is "less than 50 milliseconds". The terminal device sends the network configuration information of the application to the core network control plane network element. After receiving the network configuration information sent by the terminal device, the core network control plane network element determines, in a plurality of established network connections between the terminal device and the data network, that there is a to-be-selected network connection meeting the delay requirement "less than 50 milliseconds", and the core network control plane network element uses the to-be-selected network connection as the network connection.

When there is no at least one to-be-selected network connection, the core network control plane network element initiates a procedure of establishing the network connection that meets the network configuration information. For example, the procedure of establishing the network connection that meets the network configuration information is initiated by using the following steps a to f:

a. The core network control plane network element determines a core network user plane network element that is suitable for serving the terminal device, where the core network user plane network element can provide a configuration of the network configuration information for the application of the terminal device.

b. The core network control plane network element sends a packet forwarding policy to the core network user plane network element, so that the core network user plane network element performs forwarding processing on a packet of the terminal device according to the packet forwarding policy.

c. The core network control plane network element sends a context setup request to a base station that provides a wireless access service for the terminal device, to create a forwarding path between the base station and the core network user plane network element.

d. The base station initiates a procedure of establishing a radio resource configuration between the base station and the terminal device.

e. The base station sends a context setup response to the core network control plane network element.

f. The terminal device sends a direct transfer message to the core network control plane network element by using the base station, to indicate that the network connection is successfully established.

In some embodiments, after receiving the context setup response and the direct transfer message, the core network control plane network element sends a packet forwarding policy update message to the core network user plane network element, to update the packet forwarding policy on the core network user plane network element.

In some embodiments, the core network control plane network element receives a message that is sent by the terminal device and that carries the network configuration information. The message includes a service request message, an access request message, or a resource modification request message. The access request message is sent by the terminal device to the core network control plane network element in a network registration process. For example, the access request message may be sent by the terminal device when the terminal device is powered on. The service request message is a request for establishing a signaling connection for each interface of a radio access network, and is used to enable the terminal device to be switched from an idle mode to a connected mode. The resource modification request message is a request actively initiated by the terminal device when the terminal device has a special service requirement.

The network connection that is of the application and is between the terminal device and the data network and that meets the network configuration information may be established by initiating the foregoing procedure.

In some embodiments, after the core network control plane network element receives the network configuration information, before step 402 is performed, the method further includes: The core network control plane network element verifies the network configuration information, and the verification succeeds. That the core network control plane network element verifies the network configuration information includes: The core network control plane network element performs correctness verification, executability verification, or reasonableness verification on the network configuration information according to a verification policy of an operator of the application.

According to the network connection configuration method in this embodiment of the present disclosure, after the terminal device sends the network configuration information of the application to the core network control plane network element, the core network control plane network element receives the network configuration information that is of the application and that is sent by the terminal device, and then the core network control plane network element may determine the network connection that is of the application and is between the terminal device and the data network and that meets the network configuration information. The network configuration information is used to indicate the configuration that the network connection that is of the application and that is between the terminal device and the data network needs to meet. In this embodiment of the present disclosure, because the network configuration information can indicate a desired configuration for the network connection of the application between the terminal device and the data network, the mobile communications network can provide networks with different configurations based on requirements of services requested by all applications in different types of terminal devices or requirements of services requested by different applications in a same terminal device, so that different services can be processed as required, thereby improving flexibility of service processing in the mobile communications network.

Figure 5:
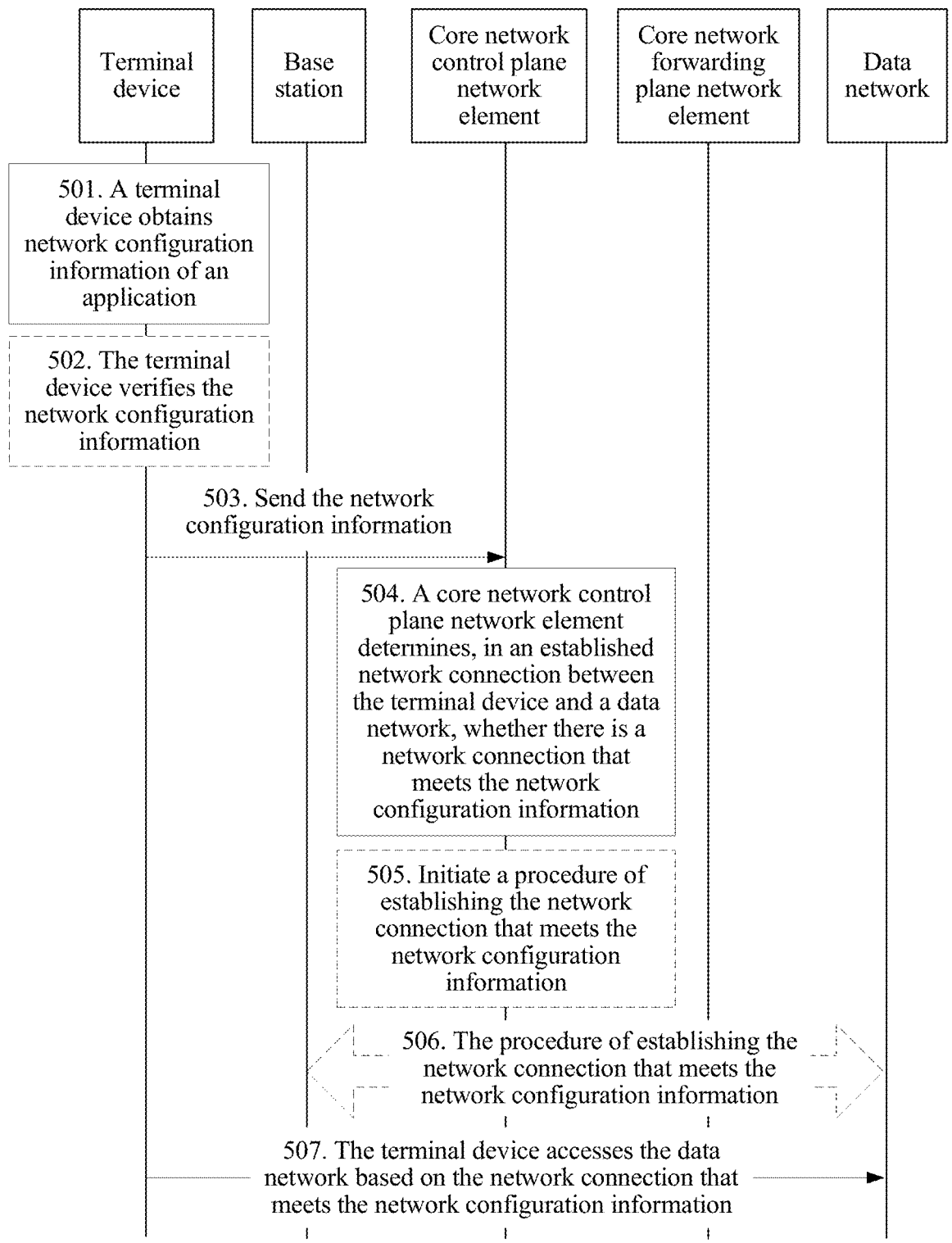
FIG. 5 is a specific flowchart of an example of a network connection configuration method according to an embodiment of the present disclosure.

Based on the foregoing embodiments, an embodiment of the present disclosure further provides an example of a network connection configuration method. The example may be applied to the terminal device in the mobile communications network shown in FIG. 1 or FIG. 2. This embodiment is described by using a PDU connection as an example of a network connection. Optionally, the network connection may alternatively be a bearer or a service flow between the terminal device and a data network. Referring to FIG. 5, a specific procedure of the example includes the following steps.

Step 501: The terminal device obtains network configuration information of an application (for example, an application of a video call service). For example, a delay requirement included in the network configuration information is "less than 50 milliseconds".

In some embodiments, the terminal device may obtain the network configuration information in the three manners described in step 301 in FIG. 3, and details are not described herein again.

Step 502: The terminal device verifies the network configuration information, where the verification performed by the terminal device on the network configuration information includes correctness verification, executability verification, or reasonableness verification on specific information included in the network configuration information.

Step 503: After verification performed on the network configuration information by the terminal device succeeds, the terminal device sends the network configuration information to a core network control plane network element.

It should be noted that step 502 is an optional step. When step 502 is not performed, in step 503, the terminal device may directly send the network configuration information to the core network control plane network element.

Step 504: After receiving the network configuration information sent by the terminal device, the core network control plane network element determines, in an established PDU connection between the terminal device and a data network, whether there is a PDU connection meeting the network configuration information (such as a delay requirement "less than 50 milliseconds"), and directly performs step 507 when determining that there is the PDU connection meeting the network configuration information, or performs step 505 when determining that there is no PDU connection meeting the delay requirement "less than 50 milliseconds".

Step 505: When determining that there is no PDU connection meeting the network configuration information, the terminal device initiates a procedure of establishing the PDU connection meeting the network configuration information.

Step 506: A base station, the core network control plane network element, and a core network user plane network element perform communication interaction with each other, to execute the procedure of establishing the PDU connection meeting the network configuration information.

Step 507: The terminal device accesses the data network based on the PDU connection meeting the network configuration information.

Based on the foregoing example, according to the network connection configuration method provided in this embodiment of the present disclosure, after obtaining the delay requirement "less than 50 milliseconds" corresponding to the video call application, the terminal device sends the delay requirement "less than 50 milliseconds" to the core network control plane network element, so that the core network control plane network element may determine the PDU connection that is of the application and is between the terminal device and the data network and that meets the delay requirement "less than 50 milliseconds". In this way, the mobile communications network can process a service of the application in the terminal device as required based on a requirement of the service requested by the application in the terminal device, to improve flexibility of service processing in the mobile communications network.

Figure 6:
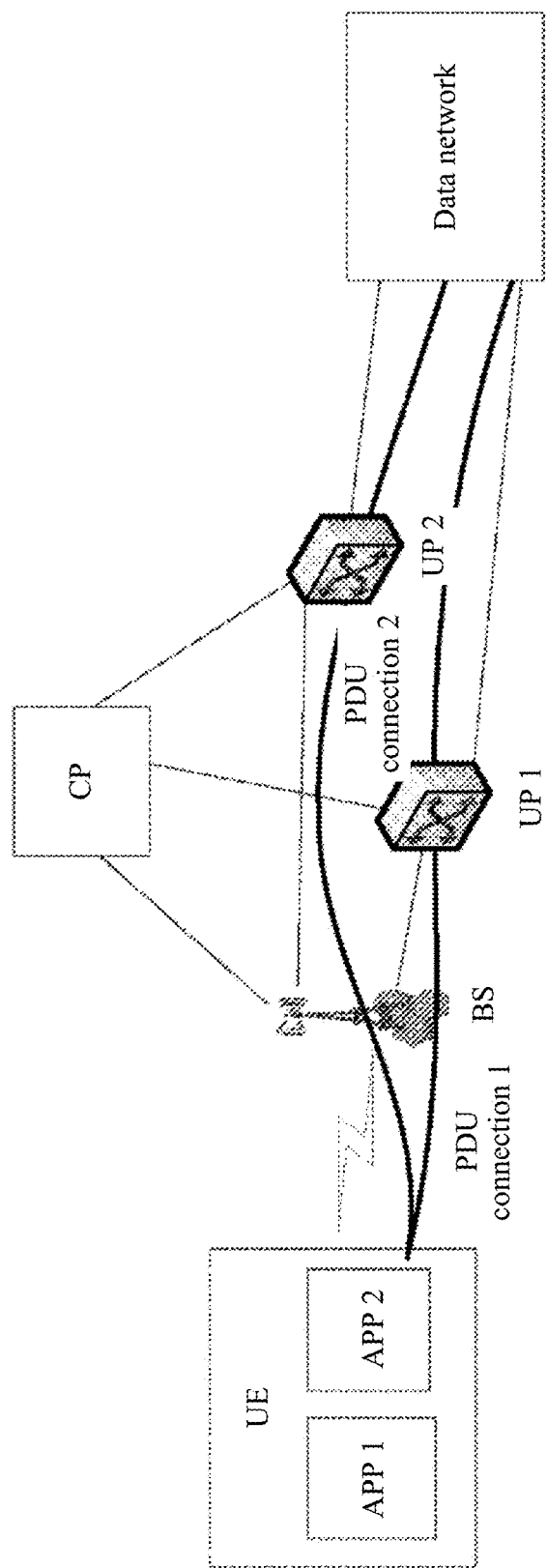
FIG. 6 is a schematic diagram of an application scenario of a network connection configuration method according to an embodiment of the present disclosure.

Based on the foregoing embodiments, an embodiment of the present disclosure further provides an application scenario of a network connection configuration method. As shown in FIG. 6, the application scenario includes UE, a CP, a UP 1, and a UP 2. Applications in the terminal device may include an application (APP) 1 and an APP 2.

After obtaining network configuration information (to be specific, a delay needs to be less than 50 milliseconds) of the APP 1, the UE sends the network configuration information of the APP 1 to the CP. The CP determines that there is no PDU connection meeting a condition, initiates a procedure of establishing a new PDU connection for the UE, and selects the UP 1 to serve the APP 1 of the UE. A service of the APP 1 of the UE accesses a data network by establishing a PDU connection 1.

After obtaining network configuration information (to be specific, a delay needs to be less than 100 milliseconds) of the APP 2, the UE sends the network configuration information of the APP 2 to the CP. The CP determines that there is a PDU connection 2 meeting a condition. As shown in the figure, a service of the APP 2 of the UE accesses the data network by using the PDU connection 2 meeting the condition.

Figure 7:
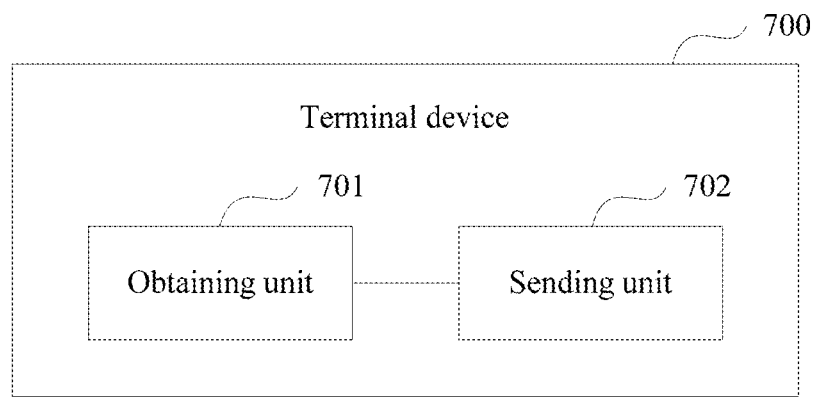
FIG. 7 is a schematic structural diagram of a terminal device according to an embodiment of the present disclosure.

Based on the foregoing embodiments, an embodiment of the present disclosure further provides a terminal device. The terminal device is applied to the mobile communications network shown in FIG. 1 or FIG. 2, and is configured to implement the network connection configuration method shown in FIG. 3. Referring to FIG. 7, a terminal device 700 includes an obtaining unit 701 and a sending unit 702.

The obtaining unit 701 is configured to obtain network configuration information of an application in the terminal device 700, and the network configuration information is used to indicate a desired configuration for a network connection of the application between the terminal device 700 and a data network.

The sending unit 702 is configured to send the network configuration information to a core network control plane network element.

In some embodiments, the network connection is a protocol data unit PDU connection, a bearer, or a service flow.

In some embodiments, the obtaining unit 701 is specifically configured to:

obtain the network configuration information that is locally configured; or obtain the network configuration information by using network information configuration software; or the sending unit 702 is further configured to send a configuration information request to an application server, and the obtaining unit 701 is specifically configured to receive the network configuration information returned by the application server.

In some embodiments, the terminal device 700 further includes:

a verification unit, configured to verify the network configuration information after the obtaining unit 701 obtains the network configuration information and before the sending unit 702 sends the network configuration information to the core network control plane network element.

In some embodiments, the network configuration information includes at least one of or a combination of the following items: mobility management requirement information, packet transfer mode information, quality of service QoS requirement information, network slice information, and a service type.

In some embodiments, the sending unit 702 is specifically configured to:

send, to the core network control plane network element, the message carrying the network configuration information, where the message includes a service request message, an access request message, or a resource modification request message.

In the terminal device provided in this embodiment of the present disclosure, after the terminal device obtains the network configuration information of the application in the terminal device, the terminal device sends the network configuration information to the core network control plane network element, so that the core network control plane network element may determine a network connection of the application between the terminal device and the data network such the network connection satisfies the network configuration information. The network configuration information is used to indicate a desired configuration for the network connection, for use by the application, between the terminal device and the data network. In this embodiment of the present disclosure, because the network configuration information can indicate the configuration that the network connection that is of the application and that is between the terminal device and the data network needs to meet, the mobile communications network can provide networks with different configurations based on requirements of services requested by applications in different types of terminal devices or requirements of services requested by different applications in a same terminal device, so that different services can be processed as required, thereby improving flexibility of service processing in the mobile communications network.

Figure 8:
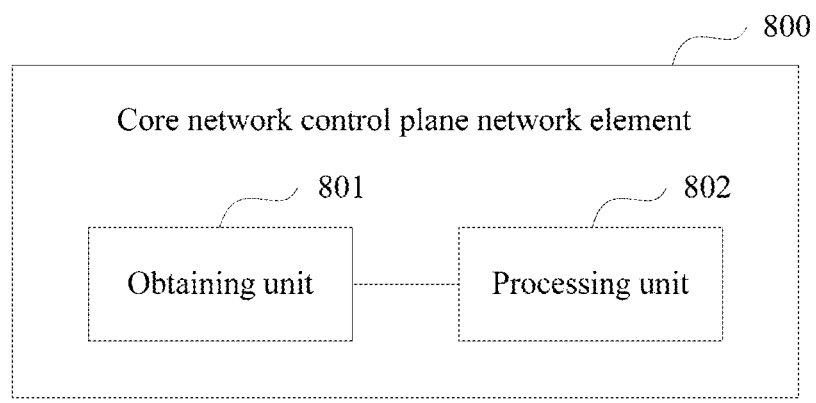
FIG. 8 is a schematic structural diagram of a core network control plane network element according to an embodiment of the present disclosure.

Based on the foregoing embodiments, an embodiment of the present disclosure further provides a core network control plane network element. The core network control plane network element is applied to the mobile communications network shown in FIG. 1 or FIG. 2, and is configured to implement the network connection configuration method shown in FIG. 4. Referring to FIG. 8, a core network control plane network element 800 includes an obtaining unit 801 and a processing unit 802.

The obtaining unit 801 is configured to receive network configuration information of an application, which is sent by a terminal device, and the network configuration information is used to indicate a configuration that a network connection that is of the application and that is between the terminal device and a data network needs to meet.

The processing unit 802 is configured to determine a network connection that is of the application and is between the terminal device and the data network and that meets the network configuration information.

In some embodiments, the processing unit 802 is specifically configured to:

determine, in an established network connection between the terminal device and the data network, whether there is at least one to-be-selected network connection that meets the network configuration information; and when there is the at least one to-be-selected network connection, use one of the at least one to-be-selected network connection as the network connection; or when there is no at least one to-be-selected network connection, initiate a procedure of establishing the network connection that meets the network configuration information.

In some embodiments, the network connection is a protocol data unit PDU connection, a bearer, or a service flow.

In some embodiments, the obtaining unit 801 is specifically configured to:

receive a message that is sent by the terminal device and that carries the network configuration information, where the message includes a service request message, an access request message, or a resource modification request message.

In some embodiments, the core network control plane network element 800 further includes:

a verification unit, configured to verify the network configuration information after the obtaining unit 801 receives the network configuration information and before the processing unit 802 determines the network connection.

In some embodiments, the network configuration information includes at least one of or a combination of the following items: mobility management requirement information, packet transfer mode information, quality of service QoS requirement information, network slice information, and a service type.

In the core network control plane network element provided in this embodiment of the present disclosure, the core network control plane network element receives the network configuration information that is of the application and that is sent by the terminal device, and then the core network control plane network element may determine the network connection that is of the application and is between the terminal device and the data network and that meets the network configuration information. The network configuration information is used to indicate a desired configuration for the network connection the application between the terminal device and the data network. In this embodiment of the present disclosure, because the network configuration information can indicate the configuration that the network connection that is of the application and that is between the terminal device and the data network needs to meet, the mobile communications network can provide networks with different configurations based on requirements of services requested by all applications in different types of terminal devices or requirements of services requested by different applications in a same terminal device, so that different services can be processed as required, thereby improving flexibility of service processing in the mobile communications network.

It should be noted that unit division in the embodiments of the present disclosure is an example, and is merely logical function division. There may be another division manner in actual implementation. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

Figure 9:
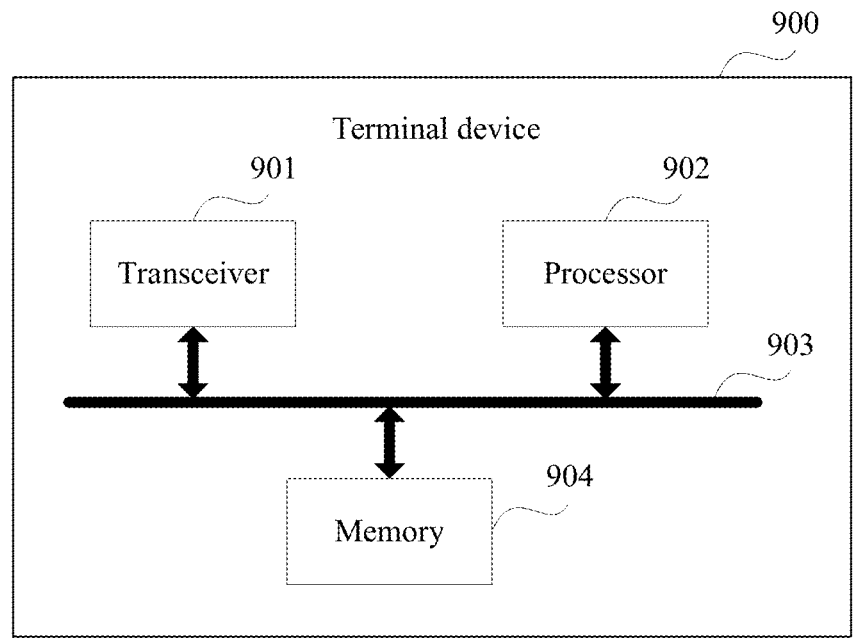
FIG. 9 is a structural diagram of a terminal device according to an embodiment of the present disclosure.

Based on the foregoing embodiments, an embodiment of the present disclosure further provides a terminal device. The terminal device is applied to the mobile communications network shown in FIG. 1 or FIG. 2. The mobile communications network further includes a core network control plane network element. Referring to FIG. 9, a terminal device 900 includes a transceiver 901, a processor 902, a bus 903, and a memory 904.

The transceiver 901, the processor 902, and the memory 904 are connected to each other by using the bus 903. The bus 903 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

The transceiver 901 is configured to perform communication interaction with another device connected to the terminal device 900 in the mobile communications network.

The processor 902 is configured to implement the network connection configuration method shown in FIG. 3, including:

obtaining network configuration information of an application in the terminal device 900, where the network configuration information is used to indicate a configuration that a network connection that is of the application and that is between the terminal device 900 and a data network needs to meet; and sending the network configuration information to the core network control plane network element.

In some embodiments, the network connection is a protocol data unit PDU connection, a bearer, or a service flow.

In some embodiments, when obtaining the network configuration information of the application in the terminal device 900, the processor 902 is specifically configured to:

obtain the network configuration information that is locally configured; or obtain the network configuration information by using network information configuration software; or send a configuration information request to an application server, and receive the network configuration information returned by the application server.

In some embodiments, the processor 902 is further configured to:

verify the network configuration information after obtaining the network configuration information and before sending the network configuration information to the core network control plane network element.

In some embodiments, the network configuration information includes at least one of or a combination of the following items: mobility management requirement information, packet transfer mode information, quality of service QoS requirement information, network slice information, and a service type.

In some embodiments, the processor 902 is specifically configured to:

send, to the core network control plane network element, the message carrying the network configuration information, where the message includes a service request message, an access request message, or a resource modification request message.

The memory 904 is configured to store a program and the like. Specifically, the program may include program code, and the program code includes a computer operation instruction. The memory 904 may include a RAM, and may further include a non-volatile memory such as at least one magnetic disk memory. The processor 902 executes the application program stored in the memory 904, to implement the foregoing function, so as to implement the network connection configuration method shown in FIG. 3.

In the terminal device provided in this embodiment of the present disclosure, after the terminal device obtains the network configuration information of the application in the terminal device, the terminal device sends the network configuration information to the core network control plane network element, so that the core network control plane network element may determine a network connection, for the application to use, between the terminal device such that the network connection satisfies the network configuration information. The network configuration information is used to indicate the configuration a desired network connection of the application between the terminal device and the data. In this embodiment of the present disclosure, because the network configuration information can indicate the configuration that the network connection that is of the application and that is between the terminal device and the data network needs to meet, the mobile communications network can provide networks with different configurations based on requirements of services requested by applications in different types of terminal devices or requirements of services requested by different applications in a same terminal device, so that different services can be processed as required, thereby improving flexibility of service processing in the mobile communications network.

Figure 10:
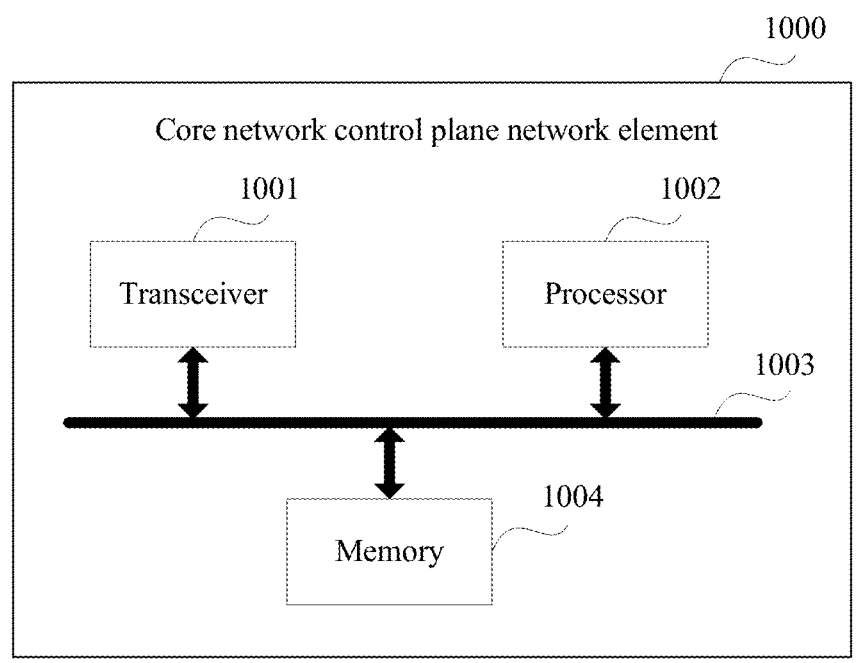
FIG. 10 is a structural diagram of a core network control plane network element according to an embodiment of the present disclosure.

Based on the foregoing embodiments, an embodiment of the present disclosure further provides a core network control plane network element. The core network control plane network element is applied to the mobile communications network shown in FIG. 1 or FIG. 2. The mobile communications network includes a terminal device. Referring to FIG. 10, a core network control plane network element 1000 includes a transceiver 1001, a processor 1002, a bus 1003, and a memory 1004.

The transceiver 1001, the processor 1002, and the memory 1004 are connected to each other by using the bus 1003. The bus 1003 may be a PCI bus, an EISA bus, or the like. The bus may be classified into an address bus, a data bus, a control bus, and the like. For ease of representation, only one thick line is used to represent the bus in FIG. 10, but this does not mean that there is only one bus or only one type of bus.

The transceiver 1001 is configured to perform communication interaction with another device connected to the core network control plane network element 1000 in the mobile communications network.

The processor 1002 is configured to implement the network connection configuration method shown in FIG. 4, including:

receiving network configuration information that is of an application and that is sent by the terminal device, where the network configuration information is used to indicate a configuration that a network connection that is of the application and that is between the terminal device and a data network needs to meet; and determining a network connection that is of the application and is between the terminal device and the data network and that meets the network configuration information.

In some embodiments, the processor 1002 is specifically configured to:

determine, in an established network connection between the terminal device and the data network, whether there is at least one to-be-selected network connection that meets the network configuration information; and when there is the at least one to-be-selected network connection, use one of the at least one to-be-selected network connection as the network connection; or when there is no at least one to-be-selected network connection, initiate a procedure of establishing the network connection that meets the network configuration information.

In some embodiments, the network connection is a protocol data unit PDU connection, a bearer, or a service flow.

In some embodiments, the processor 1002 is specifically configured to:

receive a message that is sent by the terminal device and that carries the network configuration information, where the message includes a service request message, an access request message, or a resource modification request message.

In some embodiments, the processor 1002 is further configured to:

verify the network configuration information after receiving the network configuration information and before determining the network connection.

In some embodiments, the network configuration information includes at least one of or a combination of the following items: mobility management requirement information, packet transfer mode information, quality of service QoS requirement information, network slice information, and a service type.

The memory 1004 is configured to store a program and the like. Specifically, the program may include program code, and the program code includes a computer operation instruction. The memory 1004 may include a RAM, and may further include a non-volatile memory such as at least one magnetic disk memory. The processor 1002 executes the application program stored in the memory 1004, to implement the foregoing function, so as to implement the network connection configuration method shown in FIG. 4.

In the core network control plane network element provided in this embodiment of the present disclosure, the core network control plane network element receives the network configuration information that is of the application and that is sent by the terminal device, and then the core network control plane network element may determine the network connection that is of the application and is between the terminal device and the data network and that meets the network configuration information. The network configuration information is used to indicate the configuration that the network connection that is of the application and that is between the terminal device and the data network needs to meet. In this embodiment of the present disclosure, because the network configuration information can indicate the configuration that the network connection that is of the application and that is between the terminal device and the data network needs to meet, the mobile communications network can provide networks with different configurations based on requirements of services requested by all applications in different types of terminal devices or requirements of services requested by different applications in a same terminal device, so that different services can be processed as required, thereby improving flexibility of service processing in the mobile communications network.

In conclusion, according to the network connection configuration method and the apparatus that are provided in the embodiments of the present disclosure, after the terminal device obtains the network configuration information of the application in the terminal device, the terminal device sends the network configuration information to the core network control plane network element, so that the core network control plane network element may determine the network connection that is of the application and is between the terminal device and the data network and that meets the network configuration information. The network configuration information is used to indicate the configuration that the network connection that is of the application and that is between the terminal device and the data network needs to meet. In the embodiments of the present disclosure, because the network configuration information can indicate the configuration that the network connection that is of the application and that is between the terminal device and the data network needs to meet, the mobile communications network can provide networks with different configurations based on requirements of services requested by applications in different types of terminal devices or requirements of services requested by different applications in a same terminal device, so that different services can be processed as required. Therefore, services of different applications in the terminal device are processed as required, thereby improving flexibility of service processing in the mobile communications network.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A network connection configuration method for a core network comprising a control plane network element and user plane network elements, the network connection configuration method comprising:

obtaining, by a terminal device, network configuration information of an application in the terminal device, wherein the network configuration information indicates a desired configuration for a network connection of the application between the terminal device and a data network accessible through the core network;

sending, by the terminal device, the network configuration information to the core network control plane network element to facilitate the core network control plane network element to select at least one of the user plane network elements for establishing the network connection of the application between the terminal device and the data network based on the network configuration information; and, wherein the user plane network elements include a first and a second user plane network elements, and wherein the application is a first application, the selected user plane network element for establishing the network connection between the terminal device and the data network is the first user plane network element and the network configuration information is the first network configuration information, wherein the method further comprises:
obtaining, by the terminal device, second network configuration information of a second application in the terminal device, wherein the second network configuration information indicates a desired configuration for a network connection of the second application between the terminal device and the data network; and
sending, by the terminal device, the second network configuration information to the core network control plane network element to facilitate the core network control plane network element to select at least a second user plane network element for establishing the network connection of the second application between the terminal device and the data network based on the second network configuration information.

2. The method according to claim 1, wherein the network connection is a protocol data unit (PDU) connection, a bearer, or a service flow.

3. The method according to claim 1, wherein obtaining the network configuration information comprises at least one of:
obtaining, by the terminal device, the network configuration information that is locally configured on the terminal device;
obtaining, by the terminal device, the network configuration information by using network information configuration software; or
sending, by the terminal device, a configuration information request to an application server, and receiving the network configuration information returned by the application server.

4. The method according to claim 1, wherein obtaining the network configuration information, and before sending the network configuration information, the method further comprises:
verifying, by the terminal device, the network configuration information.

5. The method according to claim 1, wherein the network configuration information comprises at least one of or a combination of the following items: mobility management requirement information, packet transfer mode information, quality of service (QoS) requirement information, network slice information, or a service type.

6. The method according to claim 1, wherein sending, by the terminal device, the network configuration information to the core network control plane network element comprises:
sending, by the terminal device to the core network control plane network element, a message carrying the network configuration information, wherein the message comprises a service request message, an access request message, or a resource modification request message.

7. A terminal device, comprising:
an interface;
a processor; and
a non-transitory computer-readable storage medium storing a program to be executed by the processor, the program including instructions to:
obtain by a terminal device, network configuration information of an application in the terminal device, wherein the network configuration information indicates a desired configuration for a network connection of the application between the terminal device and a data network accessible through a core network, wherein the core network comprises a control plane network element and user plane network elements; and
send, using the interface, the network configuration information to the core network control plane network element to facilitate the core network control plane network element to select at least one of the user plane network elements for establishing the network connection of the application between the terminal device and the data network based on the network configuration information; and, wherein the user plane network elements include a first and a second user plane network elements, and wherein the application is a first application, the selected user plane network element for establishing the network connection between the terminal device and the data network is the first user plane network element and the network configuration information is the first network configuration information, wherein the program further includes instructions to:
obtain, by the terminal device, second network configuration information of a second application in the terminal device, wherein the second network configuration information indicates a desired configuration for a network connection of the second application between the terminal device and the data network; and
send, by the terminal device, the second network configuration information to the core network control plane network element to facilitate the core network control plane network element to select at least a second user plane network element for establishing the network connection of the second application between the terminal device and the data network based on the second network configuration information.

8. The terminal device according to claim 7, wherein the network connection is a protocol data unit (PDU) connection, a bearer, or a service flow.

9. The terminal device according to claim 7, wherein to obtain the network configuration information, the program includes instructions to perform at least one of:
obtaining the network configuration information that is locally configured;
obtaining the network configuration information by using network information configuration software; or
sending, using the interface, a configuration information request to an application server, and receive, using the interface, the network configuration information returned by the application server.

10. The terminal device according to claim 7, wherein the program further includes instructions to:
verify the network configuration information after the network configuration information is obtained and before the network configuration information is sent to the core network control plane network element.

11. The terminal device according to claim 7, wherein the network configuration information comprises at least one of or a combination of the following items: mobility management requirement information, packet transfer mode information, quality of service (QoS) requirement information, network slice information, or a service type.

12. The terminal device according to claim 7, wherein to send the network configuration information, the program includes instructions to:
send, using the interface to the core network control plane network element, a message carrying the network configuration information, wherein the message comprises a service request message, an access request message, or a resource modification request message.

13. A non-transitory computer-readable medium storing computer instructions for execution by one or more processors, wherein the computer instructions instruct the one or more processors to perform:
    obtaining network configuration information of an application in the terminal device, wherein the network configuration information indicates a configuration for a network connection of the application between the terminal device and a data network accessible through a core network, wherein the core network comprises a control plane network element and user plane network elements; and
    sending the network configuration information to the core network control plane network element to facilitate the core network control plane network element to select at least one of the user plane network elements for establishing the network connection of the application between the terminal device and the data network based on the network configuration information and, wherein the user plane network elements include a first and a second user plane network elements, and wherein the application is a first application, the selected user plane network element for establishing the network connection between the terminal device and the data network is the first user plane network element and the network configuration information is the first network configuration information, wherein the method further comprises:
    obtaining, by the terminal device, second network configuration information of a second application in the terminal device, wherein the second network configuration information indicates a desired configuration for a network connection of the second application between the terminal device and the data network: and
    sending, by the terminal device, the second network configuration information to the core network control plane network element to facilitate the core network control plane network element to select at least a second user plane network element for establishing the network connection of the second application between the terminal device and the data network based on the second network configuration information.

14. The network configuration method according to claim 4, wherein the verification by the terminal device of the network configuration information comprises at least one of: correctness verification, executability verification, or reasonableness verification.

15. The n terminal device according to 10, wherein the verification by the terminal device of the network configuration information comprises at least one of: correctness verification, executability verification, or reasonableness verification.

16. The non-transitory computer-readable medium according to claim 13, wherein the user plane network elements include a first and a second user plane network elements, and wherein the application is a first application, the selected user plane network element for establishing the network connection between the terminal device and the data network is the first user plane network element and the network configuration information is the first network configuration information, wherein the computer instructions instruct the one or more processors to further perform:
    obtain, by the terminal device, second network configuration information of a second application in the terminal device, wherein the second network configuration information indicates a desired configuration for a network connection of the second application between the terminal device and the data network; and
    send, by the terminal device, the second network configuration information to the core network control plane network element to facilitate the core network control plane network element to select at least a second user plane network element for establishing the network connection of the second application between the terminal device and the data network based on the second network configuration information.

* * * * *